(12) United States Patent
Kubota et al.

(10) Patent No.: US 9,543,808 B2
(45) Date of Patent: Jan. 10, 2017

(54) POWER GENERATION SYSTEM, POWER GENERATION METHOD

(71) Applicant: MITSUBISHI HEAVY INDUSTRIES, LTD., Tokyo (JP)

(72) Inventors: Yutaka Kubota, Tokyo (JP); Takao Sakurai, Tokyo (JP); Toyotaka Hirao, Tokyo (JP); Naoki Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/654,714

(22) PCT Filed: Dec. 27, 2013

(86) PCT No.: PCT/JP2013/085109
§ 371 (c)(1),
(2) Date: Jun. 22, 2015

(87) PCT Pub. No.: WO2014/104294
PCT Pub. Date: Mar. 7, 2014

(65) Prior Publication Data
US 2015/0318763 A1 Nov. 5, 2015

(30) Foreign Application Priority Data
Dec. 28, 2012 (JP) .................................. 2012-288963

(51) Int. Cl.
*H02K 9/10* (2006.01)
*F01D 15/10* (2006.01)
(Continued)

(52) U.S. Cl.
CPC ................ *H02K 9/10* (2013.01); *F01D 15/10* (2013.01); *F01K 17/04* (2013.01); *F01K 27/02* (2013.01); *H02P 9/04* (2013.01)

(58) Field of Classification Search
CPC ............ H02K 9/10; F01K 17/04; F01K 27/02; F01D 15/10; H02P 9/04
(Continued)

(56) References Cited

U.S. PATENT DOCUMENTS 3,024,366 A 3/1962 Yanagimachi
2002/0174659 A1* 11/2002 Viteri ................ H01M 8/04022
60/780
(Continued)

FOREIGN PATENT DOCUMENTS

CN 101307751 A 11/2008
CN 101534033 A 9/2009
(Continued)

OTHER PUBLICATIONS

First Office Action issued Nov. 4, 2015 in corresponding Chinese Application No. 201380066108.4 (with partial English translation).
(Continued)

*Primary Examiner* — Viet Nguyen
(74) *Attorney, Agent, or Firm* — Wenderoth, Lind & Ponack, L.L.P.

(57) ABSTRACT

This power generation system is provided with a medium circuit, a circulation pump, an evaporator which evaporates a medium, an expander configured to be driven using the medium evaporated by the evaporator, a condenser configured to condense the medium discharged from the expander, a generator configured to be driven by the expander to generate power, a cooling system configured to cool the generator using the medium taken out from the medium circuit at a downstream side of the condenser, and a gas-liquid separator configured to separate the medium heated as a consequence of cooling the generator by the cooling system into gas and liquid phases, wherein the gas phase of the medium is flowed into the medium circuit at an upstream (Continued)

side of the condenser, and the liquid phase of the medium is flowed into the medium circuit at the downstream side of the condenser.

7 Claims, 5 Drawing Sheets

(51) Int. Cl.
*H02P 9/04* (2006.01)
*F01K 27/02* (2006.01)
*F01K 17/04* (2006.01)

(58) Field of Classification Search
USPC .................................................. 290/1 A, 2
See application file for complete search history.

(56) References Cited

U.S. PATENT DOCUMENTS

| | | | |
|---|---|---|---|
| 2007/0063594 A1 | 3/2007 | Huynh | |
| 2007/0199300 A1* | 8/2007 | MacAdam | F01K 17/025 60/39.52 |
| 2008/0087238 A1* | 4/2008 | Held | F01P 7/165 123/41.48 |
| 2011/0115445 A1* | 5/2011 | Bronicki | F01K 13/02 322/24 |
| 2013/0319027 A1* | 12/2013 | Tsubouchi | B60H 1/3201 62/238.3 |
| 2014/0125132 A1* | 5/2014 | Nordquist | F01K 13/02 307/31 |
| 2015/0204216 A1* | 7/2015 | Kamazawa | C22B 1/20 60/617 |
| 2015/0218972 A1* | 8/2015 | Ono | F01K 23/04 60/719 |

FOREIGN PATENT DOCUMENTS

| | | |
|---|---|---|
| CN | 101614139 A | 12/2009 |
| JP | 54-77848 | 6/1979 |
| JP | 2004-353571 | 12/2004 |
| JP | 2007-315190 | 12/2007 |
| JP | 2008-8218 | 1/2008 |
| JP | 4286062 | 6/2009 |
| JP | 2011-106316 | 6/2011 |
| JP | 2012-127231 | 7/2012 |
| JP | 2012-207559 | 10/2012 |

OTHER PUBLICATIONS

International Search Report issued Apr. 8, 2014 in corresponding International Application No. PCT/JP2013/085109.
Written Opinion of the International Searching Authority issued Apr. 8, 2014 in corresponding International Application No. PCT/JP2013/085109.
Notice of Reasons for Rejection issued Jun. 7, 2016 in corresponding Japanese Application No. 2012-288963 (with English translation).

* cited by examiner

POWER GENERATION SYSTEM, POWER GENERATION METHOD

TECHNICAL FIELD

The present invention relates to a power generation system and method for performing power generation using waste heat from a ship, a plant, a gas turbine, and the like, terrestrial heat, solar heat, temperature difference between cooler deep and warmer shallow ocean waters, and the like as a heat source.

Priority is claimed on Japanese Patent Application No. 2012-288963, filed Dec. 28, 2012, the content of which is incorporated herein by reference.

BACKGROUND ART

In recent years, from the point of view of effective use of energy, environmental protection, and the like, as a system for performing power generation using waste heat from a ship, a plant, a gas turbine, and the like, terrestrial heat, solar heat, temperature difference between cooler deep and warmer shallow ocean waters, and the like as a heat source, a Rankine-type power generation system has been considered. In this case, if the heat source described above is used, as a medium, for example, a medium of which a boiling point is lower than that of water and more particularly, an organic fluid such as a Freon-based medium is used.

In such a power generation system 1, as illustrated in FIG. 5, a medium is circulated by a circulation pump 6 in a cycle circuit 5 having an evaporator 2, a turbine 3, and a condenser 4. Then, a heating medium recovered from the heat source as described above is fed to the evaporator 2, is heat-exchanged with the medium, and is gasified by evaporating the medium.

The gasified medium drives a main shaft 3a to rotate by expansion in the turbine 3 and drives a generator 7. The medium expanded by the turbine 3 is condensed by the condenser 4 and is circulated to the circulation pump 6.

However, it is required to reduce a size of the turbine 3 or the generator 7 to reduce a size of the power generation system. If an amount of power equivalent to that of the related art is secured in the reduced generator 7, it is required to accelerate a rotation of the turbine 3 and the generator 7.

However, there is a concern that a temperature of each part of the generator 7 may increase and thereby cable coating, varnish, insulating paper, and the like forming the generator 7 may degrade and an insulation life be shortened by an increase in heat loss particularly due to acceleration of the rotation of the generator 7 or by a decrease in a heat radiation area due to the reduction of the size. Thus, it is preferable to cool the generator 7.

Therefore, a configuration for cooling the generator by the medium passing through the turbine is disclosed in Patent Literature 1.

Furthermore, a configuration for cooling the generator by some of the medium taken out from an outlet of the circulation pump is disclosed in Patent Literature 2.

CITATION LIST

Patent Literature

Patent Literature 1: United States Patent Application, Publication No. 2007/0063594

Patent Literature 2: Japanese Unexamined Patent Application, First Publication No. 2004-353571

SUMMARY OF INVENTION

Problem to be Solved by the Invention

However, if the medium has a low boiling point, the temperature of the medium is increased by cooling the generator 7 and some of the medium may be vaporized.

If the medium is fed to the circulation pump 6 while some of the medium is vaporized, medium delivery efficiency in the circulation pump 6 is greatly impaired. As a result, power generation efficiency in the generator 7 may be also reduced.

An object of the invention is to provide a power generation system in which a generator can be reliably cooled while a decrease in power generation efficiency is avoided and a power generation method.

Means for Solving the Problem

According to a first aspect of the present invention, a power generation system includes: a medium circuit through which a medium is circulated; a circulation pump configured to pressurize the medium so as to have the medium circulating through the medium circuit; an evaporator configured to evaporate the medium pressurized by the circulation pump, using heat from a heat source; an expander configured to be driven using the medium evaporated by the evaporator; a condenser configured to condense the medium discharged from the expander; a generator configured to be driven by the expander to generate power; a cooling system configured to cool the generator using the medium taken out from the medium circuit at a downstream side of the condenser; and a gas-liquid separator configured to separate the medium heated as a consequence of cooling the generator by the cooling system into gas and liquid phases, wherein the gas phase of the medium is flowed into the medium circuit at an upstream side of the condenser, and the liquid phase of the medium is flowed into the medium circuit at the downstream side of the condenser.

According to the above-mentioned power generation system, the generator is cooled by the medium taken out from downstream of the condenser in the cooling system. When the medium is heated by cooling the generator, some of the medium evaporates. Then, the medium is separated into the gas phase and the liquid phase in the gas-liquid separator, the gas phase of the medium is made to flow into the medium circuit upstream of the condenser and the liquid phase is made to flow into the medium circuit downstream of the condenser. Thereby it is possible to prevent lowering of the power generation efficiency caused by the reason such that the medium in which gas and liquid are mixed flows into the circulation pump.

Furthermore, the cooling system may include a flow rate-adjusting valve configured to adjust a flow rate of the medium supplied to the generator such that the medium is evaporated in the generator.

When the medium is evaporated in the generator, it is possible to further efficiently cool the generator by the heat of vaporization.

Furthermore, the circulation pump may be coaxially installed on a rotation shaft of the generator.

Thus, a motor for driving the circulation pump is not required and power loss of the circulation pump is reduced.

Here, the cooling system is operated using the medium may take out from the medium circuit at a downstream side of the circulation pump. For example, the cooling system may take the medium out from the downstream side of the circulation pump.

Furthermore, the cooling system is operated using the medium may take out from the medium circuit at an upstream side of the circulation pump. The cooling system may include a pump configured to pressurize the medium taken out from the medium circuit at the upstream side of the circulation pump.

Thus, even if the medium is taken out from the upstream side of the circulation pump, that is, from a position in which a pressure of the medium is the lowest in the medium circuit, it is possible to secure the flow of the medium in the cooling system by boosting the pressure by the pump.

Furthermore, the gas phase of the medium separated from the liquid phase of the medium by the gas-liquid separator may be flowed into the medium circuit at a downstream side of the evaporator.

According to a second aspect of the present invention, a power generation method includes the steps of: generating power by a generator, in which a medium is pressurized to have the medium circulating through a medium circuit, the pressurized medium is evaporated using heat of a heat source, an expander is rotated using the evaporated medium, and then the generator is driven using the rotation of the expander; cooling the generator using the medium taken out from the medium circuit at a downstream side of the condenser; and separating the medium heated as a consequence of cooling the generator into gas and liquid phases, wherein the gas phase of the medium is flowed into the medium circuit at an upstream side of the condenser, and the liquid phase of the medium is flowed into the medium circuit at the downstream side of the condenser.

Advantageous Effects of the Invention

According to the power generation system and the power generation method described above, it is possible to reliably cool the generator while avoiding a decrease in power generation efficiency.

DESCRIPTION OF EMBODIMENTS

Hereinafter, embodiments of a power generation system according to the present invention will be described with reference to the accompanying drawings. However, the invention is not limited to only the embodiments.

(First Embodiment)

Figure 1:
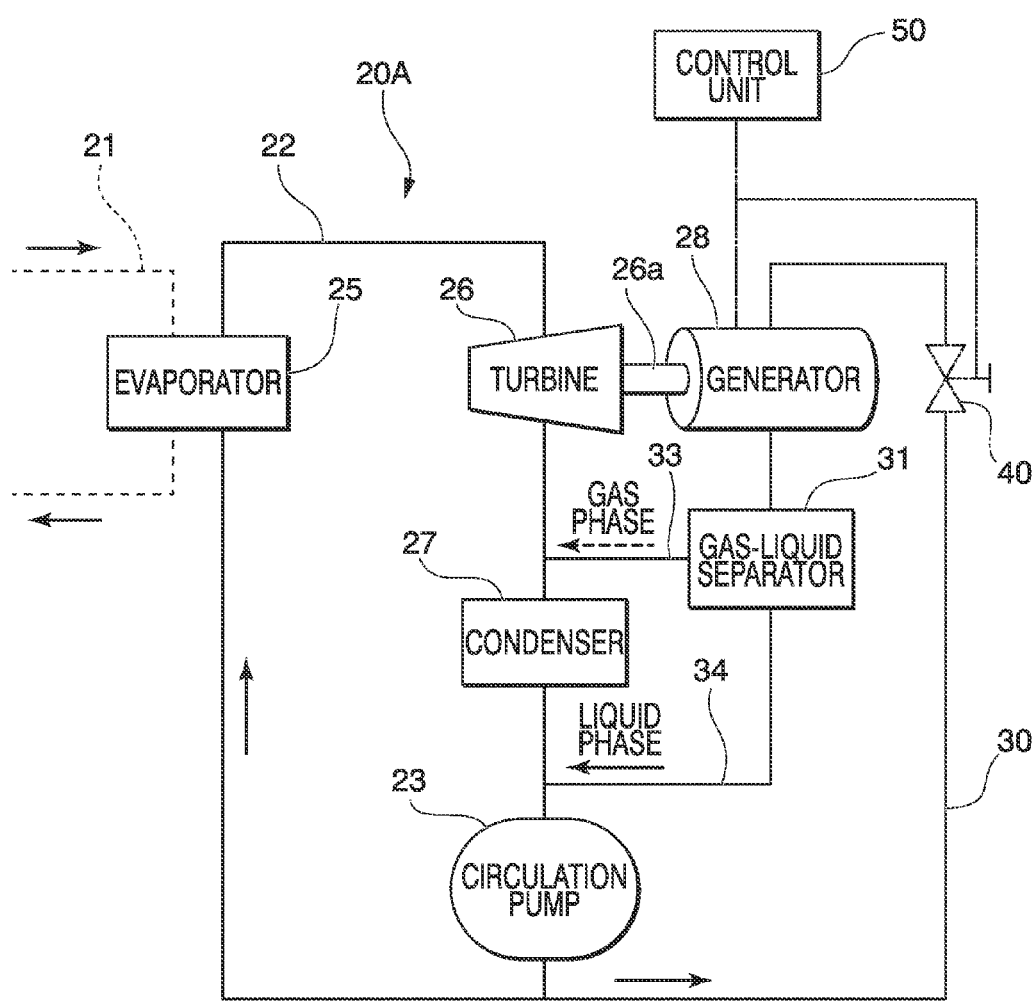
FIG. 1 is a diagram illustrating a configuration of a power generation system according to a first embodiment of the present invention.

As illustrated in FIG. 1, a power generation system 20A includes a heating medium circuit 21 into which a heating medium is fed from a heat source such as waste heat from a ship, a plant, a gas turbine, and the like, terrestrial heat, solar heat, and temperature difference between cooler deep and warmer shallow ocean waters, and a medium circuit 22 which circulates a medium (medium) capable of obtaining thermal energy by heat exchange with the heating medium of the heating medium circuit 21.

Here, as the medium of the medium circuit 22, for example, it is possible to use a medium of which a boiling point is low and which is easily vaporized, more particularly, a medium having a boiling point lower than that of water, a Freon-based medium such as HFC-134a, HFC-245fa, HFO-1234yf, and HFO-1234ze, and the like, and, a medium of Freon-based media having a boiling point lower than that of water.

The heating medium circuit 21 supplies the heating medium such as steam and water (hot water) obtained by recovering heat from the heat source.

The medium circuit 22 is provided with a circulation pump 23, an evaporator 25, a turbine (expander) 26, and a condenser 27.

The circulation pump 23 compresses the medium and sends out the medium, and thereby circulates the medium in the medium circuit 22 such that the medium sequentially passes through the evaporator 25, the turbine 26, and the condenser 27.

Since the evaporator 25 allows heat exchange between the heating medium of the heating medium circuit 21 and the medium of the medium circuit 22, the evaporator 25 heats and evaporates a pressurized medium by heat exchange with the heating medium (external heat source) supplied by the heating medium circuit 21.

The medium is expanded within a turbine chamber and thereby the turbine 26 drives a main shaft 26a around an axis thereof to rotate. The main shaft 26a is connected to a rotor (not illustrated) of a generator 28 and the rotor is driven to rotate with facing a stator (not illustrated) of the generator 28. Thus, an AC current is output from the generator 28.

In the power generation system 20A described above, a conduit (cooling system) 30 branching from the medium circuit 22 is provided at the downstream side of the condenser 27 and the downstream side (between the circulation pump 23 and the condenser 27) of the circulation pump 23. The conduit 30 is connected to a gas-liquid separator 31 through the generator 28.

In the generator 28, a medium flow path (not illustrated) through which the medium fed by the conduit 30 passes is formed in a housing and the like.

The gas-liquid separator 31 separates the medium into a gas phase and a liquid phase, a gas pipe 33 communicating with the gas phase inside the gas-liquid separator 31 is connected to the medium circuit 22 at an outlet side of the turbine 26, a liquid pipe 34 communicating with the liquid phase inside the gas-liquid separator 31 is connected to the medium circuit 22 at an outlet side of the condenser 27.

In the power generation system 20A having such a configuration, some part of the medium which passed through the circulation pump 23 is taken out from the medium circuit 22 by the conduit 30 and is fed into the generator 28. The fed medium passes through the medium flow path (not illustrated) of the generator 28 and thereby the generator 28 is cooled. Here, since the medium is heated by cooling the generator 28, some medium is gasified.

The medium cooling the generator 28 is separated into the gas phase and the liquid phase in the gas-liquid separator 31.

The gas phase of the medium flows into the medium circuit 22 at the upstream side of the condenser 27 through the gas pipe 33 and joins the gasified medium passing through an expansion process in the turbine 26. Furthermore, the liquid phase of the medium is fed into the medium circuit 22 on the downstream side of the condenser 27 through the liquid pipe 34 and joins a liquefied medium in the condenser 27.

In the manner described above, it is possible to cool the generator 28 by some medium circulating in the medium circuit 22. Furthermore, in this case, even if the medium is gasified in the generator 28, the gas phase joins the medium that is gasified in the medium circuit 22 and a remaining liquid phase joins the liquefied medium in the medium circuit 22. Thus, the medium of which some is gasified in the generator 28 is fed in the circulation pump 23 after being liquefied in the condenser 27. As a result, it is possible to prevent power generation efficiency from being lowered in the generator 28 and to also reliably cool the generator 28 without impairing medium delivery efficiency in the circulation pump 23.

(Modified Example of First Embodiment)

In the power generation system 20A having the configuration illustrated in the first embodiment described above, the conduit 30 may be provided with a flow rate adjusting valve 40 which adjusts a flow rate of the medium fed into the generator 28.

In this case, it is preferable that an opening degree of the flow rate adjusting valve 40 is adjusted under control of a control unit 50 such that the medium is gasified when cooling the generator 28. As the adjusting of an opening degree of the flow rate adjusting valve 40, for example, a temperature or a pressure of the medium at the outlet side of the generator 28 or a temperature of the generator 28 itself is measured, and the control unit 50 refers to correlation data between the temperature or the pressure which is predetermined, and the opening degree of the flow rate adjusting valve 40. Thereby it is possible to determine the opening degree of the flow rate adjusting valve 40.

Thus, it is also possible to use heat of evaporation for cooling the generator 28, along with the evaporation of the medium in the generator 28 and to cool the generator 28 more efficiently.

Furthermore, in the control unit 50, it is possible to control to monitor an amount of the medium fed into the evaporator 25, to throttle the flow rate adjusting valve 40 when the amount of the medium becomes small, and to increase the amount of the medium fed into the evaporator 25.

Figure 2:
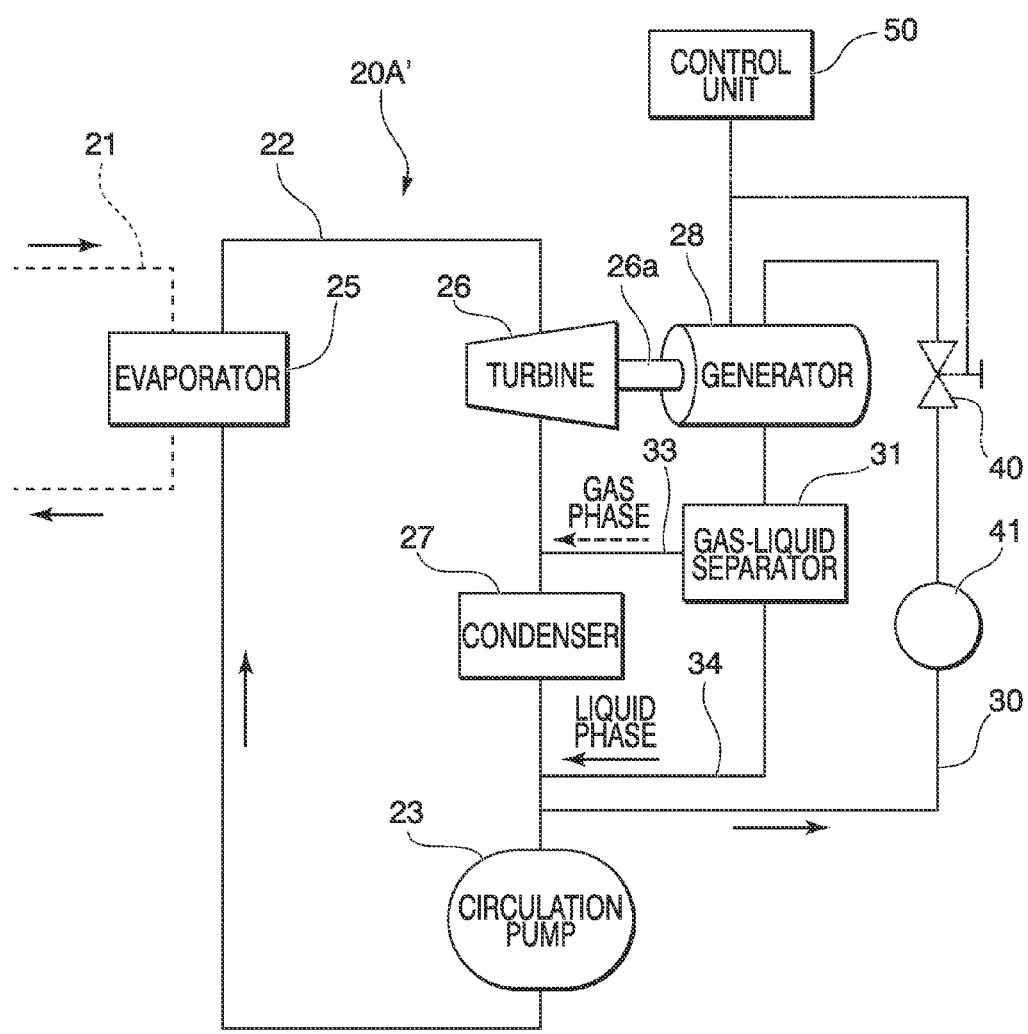
FIG. 2 is a diagram illustrating a configuration of a modified example of the power generation system according to the first embodiment of the present invention.

Furthermore, in the embodiment described above, the conduit 30 branches from the medium circuit 22 at the downstream side of the circulation pump 23, but, alternatively, as in a power generation system 20A' illustrated in FIG. 2, the medium may be taken out through the conduit 30 which branches from the medium circuit 22 at the downstream side of the condenser 27 and the upstream side of the circulation pump 23.

Moreover, in such a configuration, since the medium flowing through the conduit 30 has the lowest pressure immediately before the circulation pump 23 in the medium circuit 22, it is preferable that the conduit 30 is provided with a pump 41 and the medium is supplied to the generator 28 after the medium is pressurized by the pump 41.

(Second Embodiment)

Next, a second embodiment of a power generation system according to the present invention will be described. In the following second embodiment, the same reference numerals are given in the drawings to the configurations shared by the first embodiment described above and description thereof will be omitted.

Figure 3:
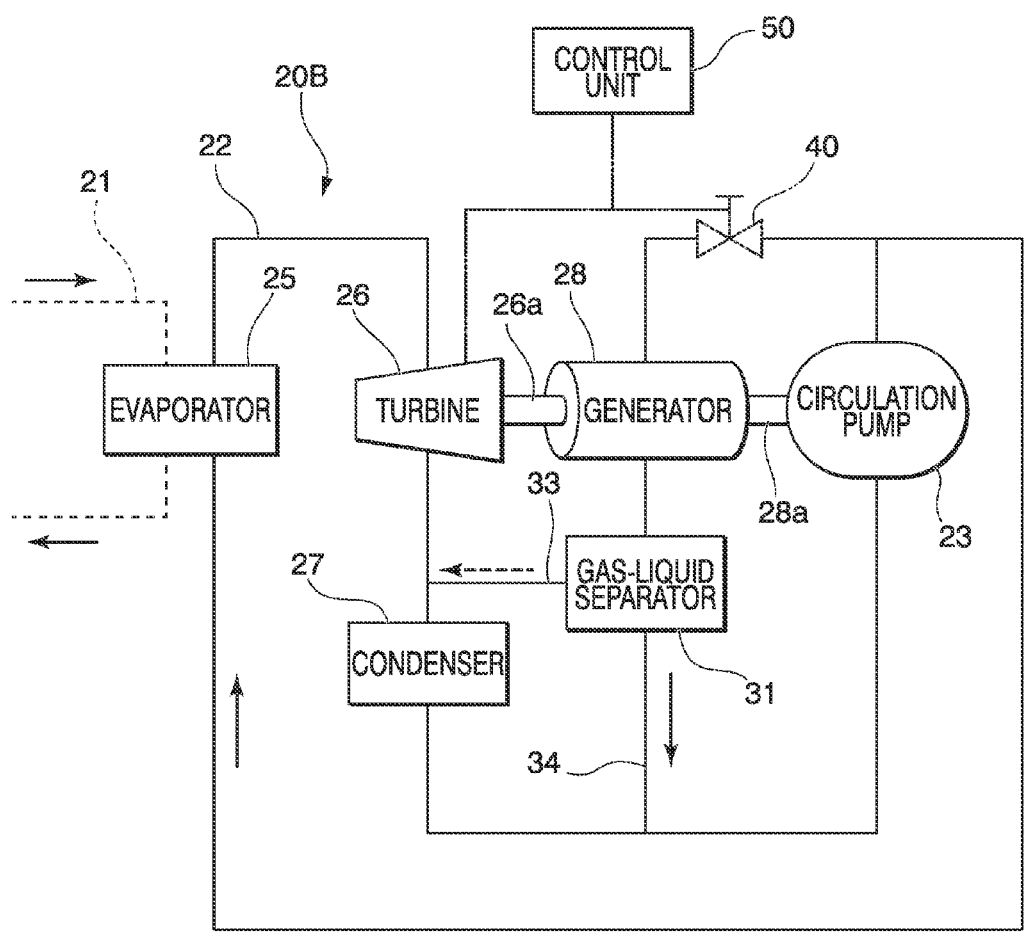
FIG. 3 is a diagram illustrating a configuration of a power generation system according to a second embodiment of the present invention.

As illustrated in FIG. 3, a basic configuration of machinery included in a power generation system 20B according to the embodiment, is shared by the power generation system 20A according to the first embodiment described above. In the power generation system 20B, a circulation pump 23 is provided coaxially with a rotation shaft 28a of a generator 28 and is driven by the rotation of the rotation shaft 28a.

In this case, the circulation pump 23 may be connected to the rotation shaft 28a of the generator 28 through a transmission.

Also in the power generation system 20B having such a configuration, similar to the power generation system 20A of the first embodiment described above, it is possible to prevent power generation efficiency from being lowered in the generator 28 and to also reliably cool the generator 28 without impairing medium delivery efficiency in the circulation pump 23.

Furthermore, the circulation pump 23 is provided coaxially with the rotation shaft 28a of the generator 28 and thereby a motor for driving the circulation pump 23 and the like are not required. Thus, it is possible to decrease power loss in the circulation pump 23 and to increase the power generation efficiency in the generator 28.

In addition, the circulation pump 23 is connected to the rotation shaft 28a of the generator 28 through the transmission and thereby it is possible to handle a turbine 26 and the generator 28 which are rotated at high speed.

Moreover, as illustrated in FIG. 2, also in the configuration illustrated in the second embodiment described above, it is possible to take out the medium through a conduit 30 which branches from the medium circuit 22 at a downstream side of a condenser 27 and an upstream side of the circulation pump 23.

(Another Modified Example)

Moreover, the power generation system of the invention is not limited to each of the embodiments described above with reference to the drawings and various modifications may be applied within the technical scope of the present invention.

For example, in the above described embodiments, the gas phase of the medium separated in the separator 31 flows into the medium circuit 22 at the upstream side of the condenser 27 However, the present invention is not limited to this configuration. The gas phase of the medium at the downstream side of the evaporator 25 may flow into the medium circuit 22.

Figure 4:
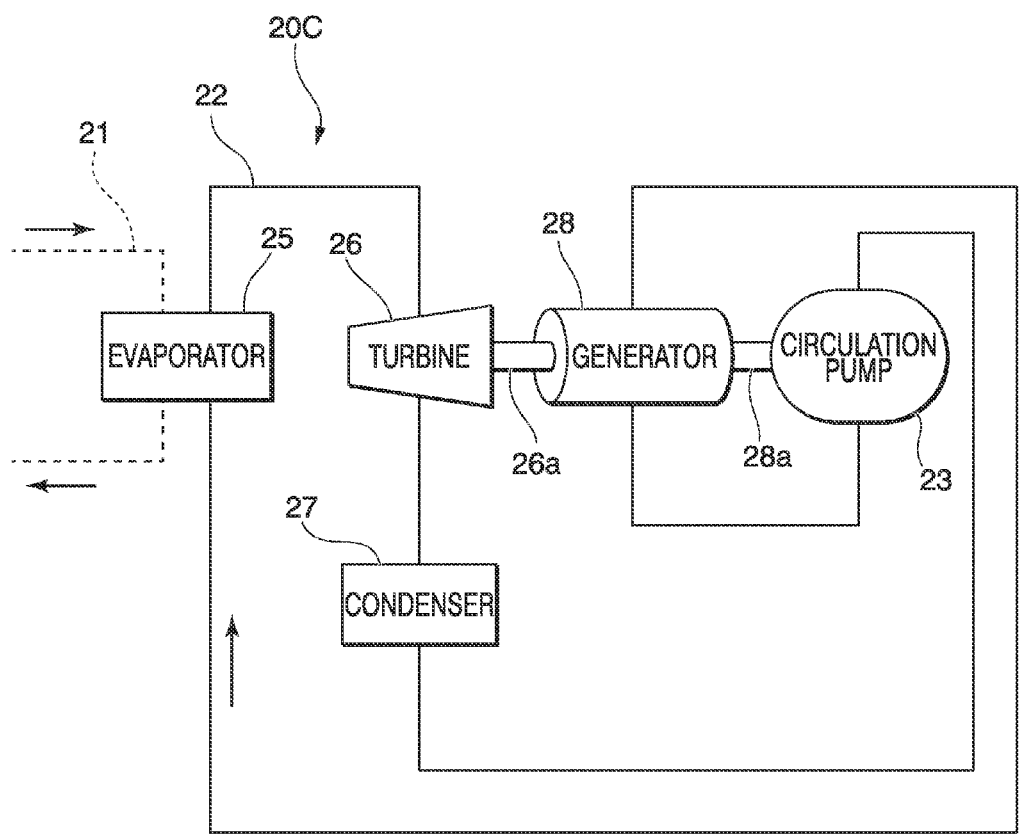
FIG. 4 is a diagram illustrating a configuration of another example of a power generation system.
Figure 5:
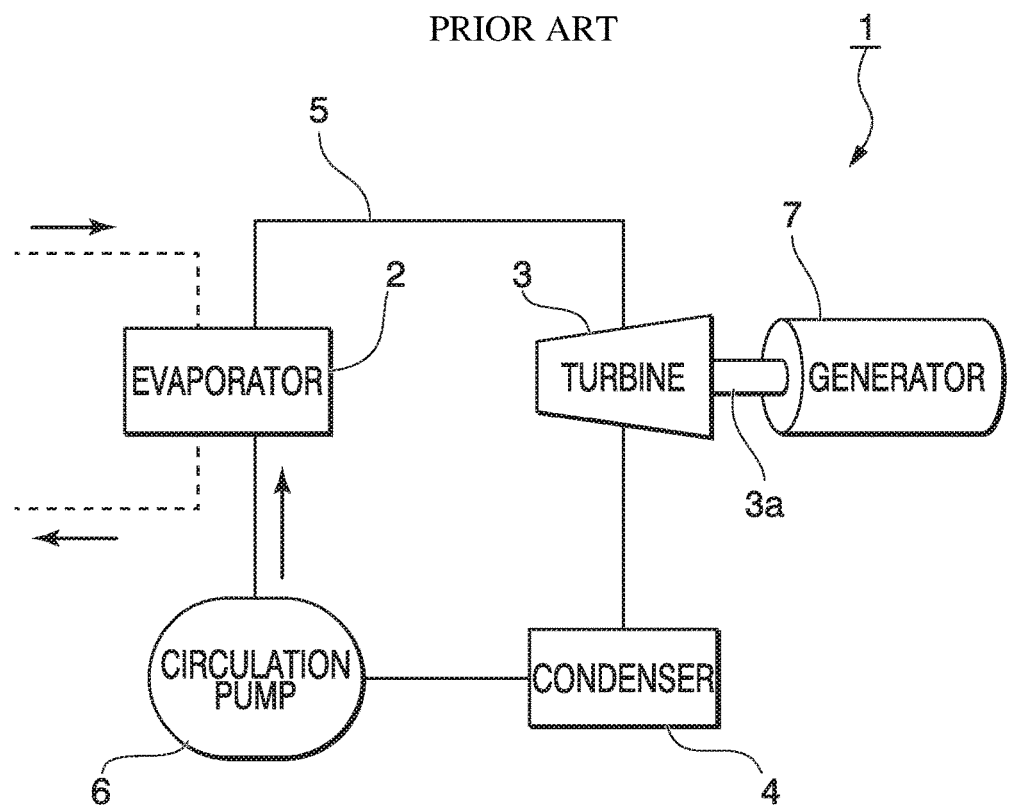
FIG. 5 is a diagram illustrating a configuration of a power generation system of the related art.

Furthermore, as a power generation system 20C illustrated in FIG. 4, the medium circuit 22 can be configured to reach the evaporator 25 through the generator 28 after passing through the circulation pump 23.

Thus, all amount of the medium delivered from the circulation pump 23 is fed to the medium flow path (not illustrated) of the generator 28 and cools the generator 28.

Also in such a configuration, it is possible to reliably cool the generator 28.

For example, in each of the power generation systems 20A, 20A', 20B, and 20C of the embodiments described above, waste heat from a ship, a plant, a gas turbine, and the like, terrestrial heat, solar heat, and temperature difference between cooler deep and warmer shallow ocean waters are used as the heat source for generating power; however a type of heat source is arbitrary.

Furthermore, in each of the embodiments described above, the turbine 26 is exemplified as the expander; however, it is possible to employ a scroll type expander instead of the turbine 26.

In addition, it is possible to choose the configurations mentioned in each of the embodiments described above and to appropriately change the configurations to other configurations without departing from the spirit of the invention.

INDUSTRIAL APPLICABILITY

According to the power generation system and the power generation method described above, it is possible to reliably cool the generator while avoiding a decrease in power generation efficiency.

REFERENCE SIGNS LIST 20A, 20A', 20B, 20C POWER GENERATION SYSTEM
21 HEATING MEDIUM CIRCUIT
22 MEDIUM CIRCUIT
23 CIRCULATION PUMP
25 EVAPORATOR
26 TURBINE (EXPANDER)
26A MAIN SHAFT
27 CONDENSER
28 GENERATOR
30 CONDUIT (COOLING SYSTEM)
31 GAS-LIQUID SEPARATOR
33 GAS PIPE
34 LIQUID PIPE
40 FLOW RATE ADJUSTING VALVE
41 PUMP
50 CONTROL UNIT

The invention claimed is:

1. A power generation system comprising:
a medium circuit through which a medium is circulated;
a circulation pump configured to pressurize the medium so as to have the medium circulating through the medium circuit;
an evaporator configured to evaporate the medium pressurized by the circulation pump, using heat from a heat source;
an expander configured to be driven using the medium evaporated by the evaporator;
a condenser configured to condense the medium discharged from the expander;
a generator configured to be driven by the expander to generate power;
a cooling system configured to cool the generator using the medium taken out from the medium circuit at a downstream side of the condenser; and
a gas-liquid separator configured to separate the medium heated as a consequence of cooling the generator by the cooling system into gas and liquid phases, wherein the gas phase of the medium is flowed into the medium circuit at an upstream side of the condenser, and the liquid phase of the medium is flowed into the medium circuit at a downstream side of the condenser.

2. The power generation system according to claim 1, further comprising a flow rate-adjusting valve configured to adjust a flow rate of the medium supplied to the generator such that the medium is evaporated in the generator.

3. The power generation system according to claim 1, wherein
the circulation pump is coaxially installed on a rotation shaft of the generator.

4. The power generation system according to claim 1, wherein
the cooling system is operated using the medium taken out from the medium circuit at a downstream of the circulation pump.

5. The power generation system according to claim 1, wherein
the cooling system is operated using the medium taken out from the medium circuit at an upstream side of the circulation pump, and wherein
the cooling system includes a pump configured to pressurize the medium taken out from the medium circuit at the upstream side of the circulation pump.

6. The power generation system according to claim 1, wherein
the gas phase of the medium separated from the liquid phase of the medium by the gas-liquid separator is flowed into the medium circuit at a downstream side of the evaporator.

7. A power generation method comprising the steps of:
generating power by a generator, in which a medium is pressurized to have the medium circulating through a medium circuit, the pressurized medium is evaporated using heat of a heat source, an expander is rotated using the evaporated medium, and then the generator is driven using the rotation of the expander;
cooling the generator using the medium taken out from the medium circuit at a downstream side of a condenser configured to condense the medium discharged from the expander; and
separating the medium heated as a consequence of cooling the generator into gas and liquid phases, wherein the gas phase of the medium is flowed into the medium circuit at an upstream side of the condenser, and the liquid phase of the medium is flowed into the medium circuit at a downstream side of the condenser.

* * * * *